No. 738,215. PATENTED SEPT. 8, 1903.
J. T. LISTER.
MANTLE SUPPORT.
APPLICATION FILED OCT. 27, 1902.
NO MODEL.
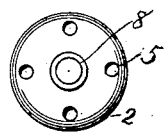
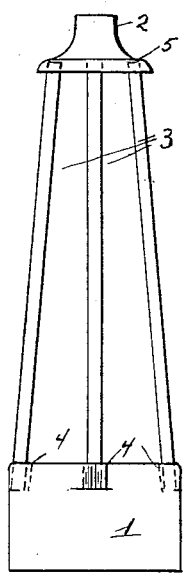
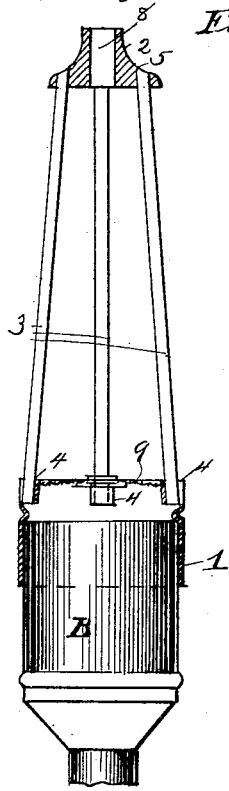
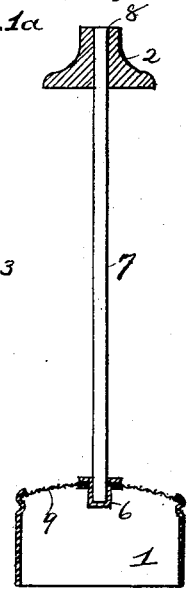
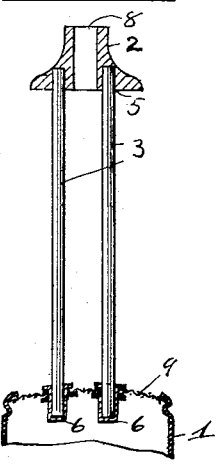
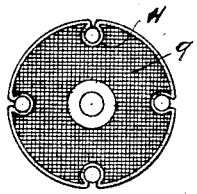
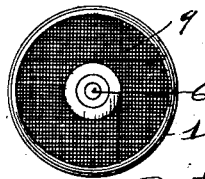

No. 738,215. Patented September 8, 1903.

UNITED STATES PATENT OFFICE.

JOHN T. LISTER, OF CLEVELAND, OHIO.

MANTLE-SUPPORT.

SPECIFICATION forming part of Letters Patent No. 738,215, dated September 8, 1903.

Application filed October 27, 1902. Serial No. 128,943. (No model.)

*To all whom it may concern:*

Be it known that I, JOHN T. LISTER, a citizen of the United States, and a resident of Cleveland, county of Cuyahuga, State of Ohio, have invented certain new and useful Improvements in Mantle-Supports, of which I hereby declare the following to be a full, clear, and exact description, such as will enable others skilled in the art to which it appertains to make and use the same.

My invention has for its objects to provide a suitable inside support for the mantle which will also distend and maintain it in its expanded condition, whereby it will not become distorted when the stiffening agent is burned away and also that will sustain the mantle, so that vibrations will not disintegrate it.

My invention consists in a crown of refractory and incandescing material upon which the upper portion of the mantle rests, a base sleeved over the burner, and refractory means for connecting the crown and base and for giving increased illuminating power to the mantle, as hereinafter described, shown in the accompanying drawings, and specifically pointed out in the claims.

In the accompanying drawings, Figure 1 is a vertical central section of a mantle-support embodying my improvement. Fig. 1ª is a view of the supporting-rod. Fig. 2 is a side view of the mantle-support shown in Fig. 1. Fig. 3 is a similar section to Fig. 1, showing only two supporting-rods, the sockets for which in the base are attached to the wire-gauze cover. Fig. 4 is a plan view of the base. Fig. 5 shows a solid crown, that shown in the other figures being perforated. Fig. 6 is a vertical central section of a simpler form, showing the crown and base and a central connecting-rod between them; and Fig. 7 is a view of the base. Fig. 8 is a plan view of a crown adapted for use with supports shown in Fig. 1.

In the views, 1 is the base or cap, sleeved over the burner B, of the usual type. 2 is the crown of refractory and incandescing material, tapering in form, so that the mantle can be sleeved over it.

3 represents rods of refractory and incandescing material, such as steatite, which are inserted in the sockets 4 in the edges of the metal base 1 and in the holes 5 in the steatite crown above. The crown and rods may be made of any suitable refractory and incandescing material.

The diameter and the general shape of the support are similar to those of a mantle, so that the mantle can be shrunk thereon, and the rods 3 are circular or rounded in section, so as to preserve the greatest strength, while opposing the passage of gas to the mantle as little as possible.

The crown 2 is provided with a central passage between the sockets 8 for the draft, so as to insure thoroughly heating the crown and the top of the mantle. The upper extremity of the crown is shown in the drawings to be upwardly tapered or reduced and especially adapted for insertion in the neck of the mantle, so as to hold the neck of the mantle securely from slipping from side to side and also to distend the neck over the draft-opening. The extended portion annularly incloses the draft-opening for this purpose.

In a simpler form shown in Figs. 6, 7, and 8 the exterior sockets in the crown and base are dispensed with and a central socket or sockets 6 in the base receive a central rod or rods 7, which are inserted within the central opening or openings in the crown. Here the shape of the crown is relied on to properly support the mantle, the bottom of which is sleeved over the base, as is also done in the first-named device.

In the figures a wire screen 9 is shown inserted in the base, which serves to commingle gas and air and to distribute them. This wire screen or gauze takes the place of the screen usually employed in the burner-cap, and the mantle-holder is substituted for the usual burner-cap, thus making a complete burner-mantelette.

The mantle being placed upon the support, the entire device is ready to put upon the burner-tube, and thus all the difficulty experienced in handling and placing the mantle in position over the burner-cap is avoided.

Having described my invention, what I claim as new, and desire to secure by Letters Patent, is—

1. In combination in a mantle-support, a crown of refractory and incandescing material provided with sockets, and with a central draft-passage a metal base provided with sockets, and rods of refractory material connecting said crown and base and inserted in said sockets, substantially as described.

2. In a mantle-support, in combination with a burner-tube, a metal base sleeved over said tube, a crown shaped to support a mantle formed of refractory material and provided with a central draft-passage, a rigid connection between said base, and crown and a wire-gauze inserted in said base above the burner-tube, substantially as described.

3. In a refractory and incandescing mantle-support, the combination with a burner-cap and wire screen therefor, of sockets in said cap, rods of incandescing and refractory material in the sockets, a crown of refractory and incandescing material, corresponding sockets in said crown in which the upper extremities of the rods are inserted, and a central draft-passage in said crown between the sockets, the crown being provided with an upwardly tapered or reduced extremity adapted for insertion in the neck of the mantle, substantially as described.

4. In a refractory and incandescing mantle-support, the combination with a burner-cap and wire screen thereon, of sockets in said screen, rods of refractory material in the sockets, a crown of refractory and incandescing material, adapted to engage and extend the neck of the mantle, sockets in said crown in which the upper extremities of the rods are inserted, and a central draft-passage in said crown between the sockets, substantially as described.

5. In combination, in a mantle-support, a burner-cap, a crown upon which the mantle rests, provided with an upward extension adapted for insertion within the neck of the mantle, and closely fitting therein, and with a shoulder upon which the upper portion of the mantle rests, and a rigid connection between the burner-cap and crown substantially as described.

In testimony whereof I hereby set my hand this 24th day of October, 1902.

JOHN T. LISTER.

Witnesses:
WM. M. MONROE,
R. ZBORNIK.